T. P. ADAMS.
WATER STILL.
APPLICATION FILED MAY 20, 1912.
1,148,273.
Patented July 27, 1915.
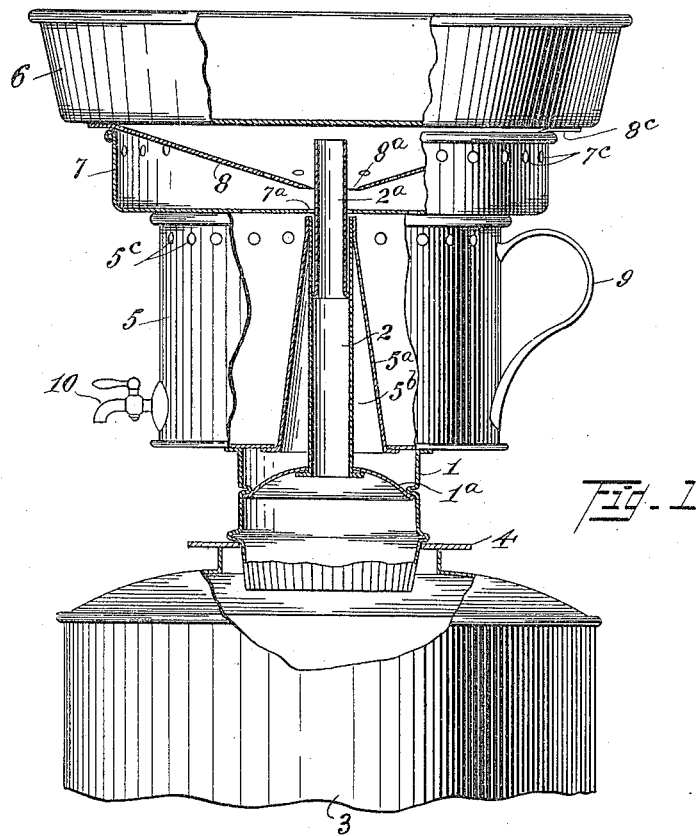
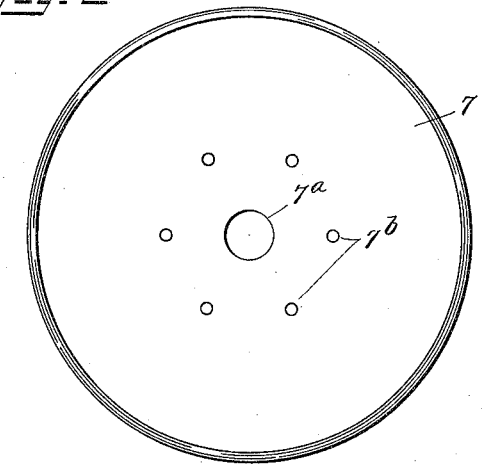
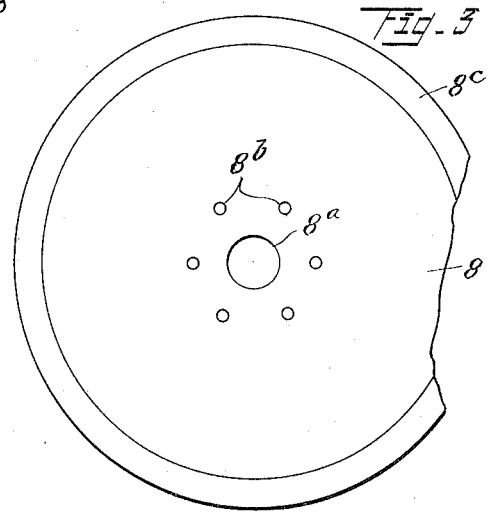

UNITED STATES PATENT OFFICE.

THOMAS P. ADAMS, OF CHICAGO, ILLINOIS, ASSIGNOR OF ONE-HALF TO LEON COOPER, OF CHICAGO, ILLINOIS.

WATER-STILL.

1,148,273. Specification of Letters Patent. Patented July 27, 1915.

Application filed May 20, 1912. Serial No. 698,509.

*To all whom it may concern:*

Be it known that I, THOMAS P. ADAMS, a citizen of the United States, residing at Chicago, in the county of Cook and State of Illinois, have invented certain new and useful Improvements in Water-Stills, of which the following is a specification.

My invention relates to improvements in water stills, the present embodiment of the invention being particularly designed and adapted for domestic use.

The primary object of the invention is to provide a generally improved water still of this class of exceedingly simple, cheap, and efficient construction, the principal working parts being particularly designed and adapted for use in combination with ordinary household or kitchen utensils such as an ordinary tea kettle as a generating or vaporizing vessel and an ordinary pan for the reception of cold water for use as a condensing pan or vessel.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1, is a view partly in side elevation and partly in central vertical section, of a water still constructed in accordance with this invention. Fig. 2, a top plan view of the vapor receiving pan detached. Fig. 3, a similar view of the drip pan used in the vapor receiving pan below the condensing pan or vessel.

Similar numerals of reference designate like parts throughout all the figures of the drawings.

The improved water still comprises a still head 1, having an upwardly extending vapor conduit pipe 2, the latter extending upwardly from the dome member 1ª, of the still head, said still head being adapted to receive the vapor from the subjacent generating vessel 3, such as an ordinary teakettle as shown in the drawings.

The lower end of the still head is preferably reduced or flared as shown, and is preferably provided with a supporting ring 4, resting upon the generating vessel or kettle 3, for supporting the water still as a whole, as well as adapting the lower end of the still head to kettles or generating vessels with varying sized lid openings.

The liquid receiving vessel 5, is preferably cylindrical or cup-shaped as shown, and is mounted above and secured to the still head 1, said receiving vessel being provided with a centrally located tubular member 5ª, said tubular member having its upper edges secured about the vapor conduit pipe and having its walls diverging or flaring downwardly forming an annular insulating space 5ᵇ, about the walls of the vapor conduit pipe 2, as shown.

The vapor conduit pipe 2, is preferably provided with a slidably mounted adjustable extension pipe 2ª, said extension conduit pipe 2ª, being adapted to be adjusted so as to convey the vapor or steam more or less directly beneath the bottom of the condensing pan or vessel 6, which condensing pan 6, may comprise an ordinary kitchen pan adapted to receive and contain the cold water or condensing medium.

The vapor receiving pan or vessel 7, is adapted to be removably mounted immediately above the liquid receiving vessel 5, and is provided in its bottom with a centrally located opening 7ª, to receive the extension pipe portion 2ª, of the vapor conduit pipe 2, and a plurality of liquid inlet openings 7ᵇ, for the conveyance of the distilled water into the subjacent receiving vessel 5.

The vapor receiving pan or vessel 7, is provided with a funnel or dish-shaped drip pan 8, said drip pan being provided with a central opening 8ª, to receive and contain the extension portion 2ª, of the vapor conduit pipe and a plurality of openings 8ᵇ, communicating with the interior of the vapor receiving pan or vessel 7. The vapor receiving pan or vessel 7, is also provided about its rim with a plurality of openings 7ᶜ, and the drip pan 8, is provided with a flattened rim portion 8ᶜ, adapted to rest upon the beaded rim of the vapor receiving pan and extending over the same to support the superposed condensing pan 6, said rim portion 8ᶜ, when moistened by the vapor in the vapor receiving pan forming a water sealed joint.

The liquid receiving vessel 5, is preferably provided about its upper marginal edges with openings 5ᶜ, which permit of an air circulation therethrough and through the openings in the vapor receiving pan 7, and drip pan 8.

The liquid receiving vessel or cup 5, is provided with a handle 9, at one side and a faucet 10, at the other for the convenient handling of the still and the drawing off of the distilled liquid received in the vessel or cup 5.

From the foregoing description, taken in connection with the accompanying drawings, the operation and advantages of my invention will be readily understood.

Having thus described one of the embodiments of my invention, what I claim and desire to secure by Letters Patent is,—

1. In a water still, a liquid receiving vessel provided with a still head beneath its bottom, a two-part extensible vapor conduit pipe carried by said still head and extending upwardly through said liquid receiving vessel, and a centrally located upwardly converging tubular member carried by said vessel and spaced from and surrounding said vapor conduit pipe forming an annular converging insulating space between the walls of said conduit pipe and said tubular member.

2. In a water still, a liquid receiving vessel provided with a centrally located downwardly flaring tubular member, a still head carried by said vessel and provided with a dome shaped member below said tubular member, a vapor conduit pipe extending from said dome shaped member and spaced from and extending through said tubular member, and an extension pipe slidably and adjustably mounted in said vapor conduit pipe.

3. In a water still, a liquid receiving vessel provided at its bottom with a still head, including a centrally located vapor conduit pipe extending upwardly through said liquid receiving vessel, said pipe being provided with an adjustable extension pipe, a vapor receiving pan removably mounted above said liquid receiving vessel and provided with an opening taking over said adjustable extension pipe, a perforated funnel shaped drip pan removably mounted above and extending within said vapor receiving pan and provided with an opening taking over said adjustable extension pipe, and a condensing pan removably mounted above said drip pan and immediately above said adjustable extension pipe.

4. A water still, comprising a generating vessel, a still head having an upwardly extending vapor conduit pipe, a removable vapor receiving pan having an opening surrounding said vapor conduit pipe, a condensing pan removably mounted above said vapor receiving pan and immediately above said vapor conduit pipe, a perforated drip pan removably mounted in said vapor receiving pan and supporting said condensing pan, and a liquid receiving vessel below said vapor receiving pan and provided with an upwardly converging tubular member spaced from and surrounding said conduit pipe.

5. A water still, comprising a generating vessel, a liquid receiving vessel provided with a subjacent still head having a vapor conduit pipe extending upwardly therethrough, a downwardly flaring centrally located tubular member within said liquid receiving vessel and surrounding and spaced from said vapor conduit pipe, a vapor receiving pan removably mounted on said liquid receiving vessel and provided with an opening immediately above said vapor conduit pipe, a drip pan removably mounted upon and depending within said vapor receiving vessel and provided with a centrally located opening, a condensing pan removably mounted above said drip and vapor receiving pans, and an extension pipe adjustably mounted in said vapor conduit pipe and extending through the openings in said vapor receiving and drip pans, said extension pipe being adjustable toward and from said condensing pan to vary the condensing space below the latter.

In testimony whereof I have affixed my signature in presence of two witnesses.

THOMAS P. ADAMS.

Witnesses:
Thos. J. Hanley,
A. J. Giannom.